Oct. 21, 1941.   P. P. DEAN   2,259,437
CONTROL APPARATUS
Filed March 1, 1939   6 Sheets-Sheet 1
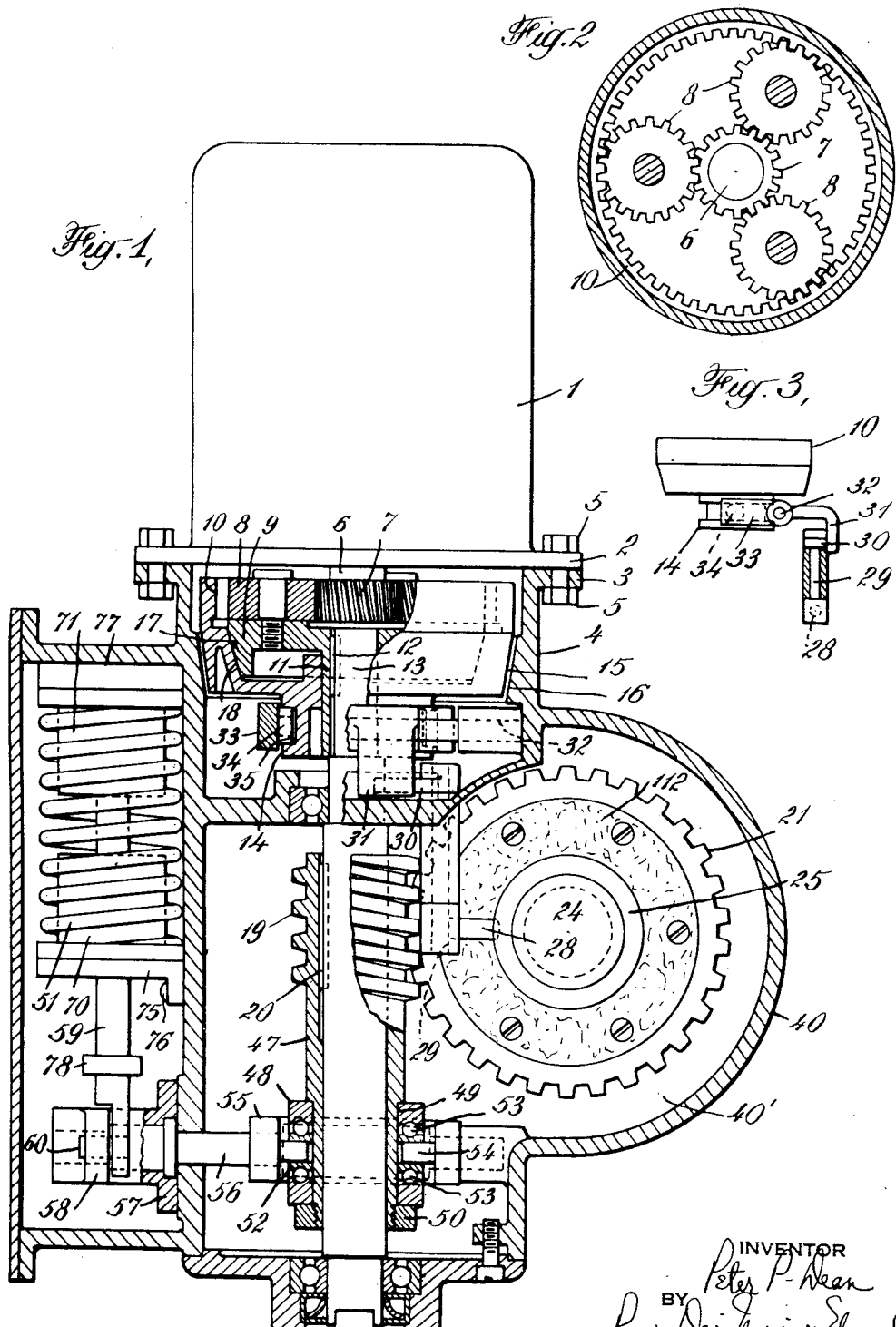

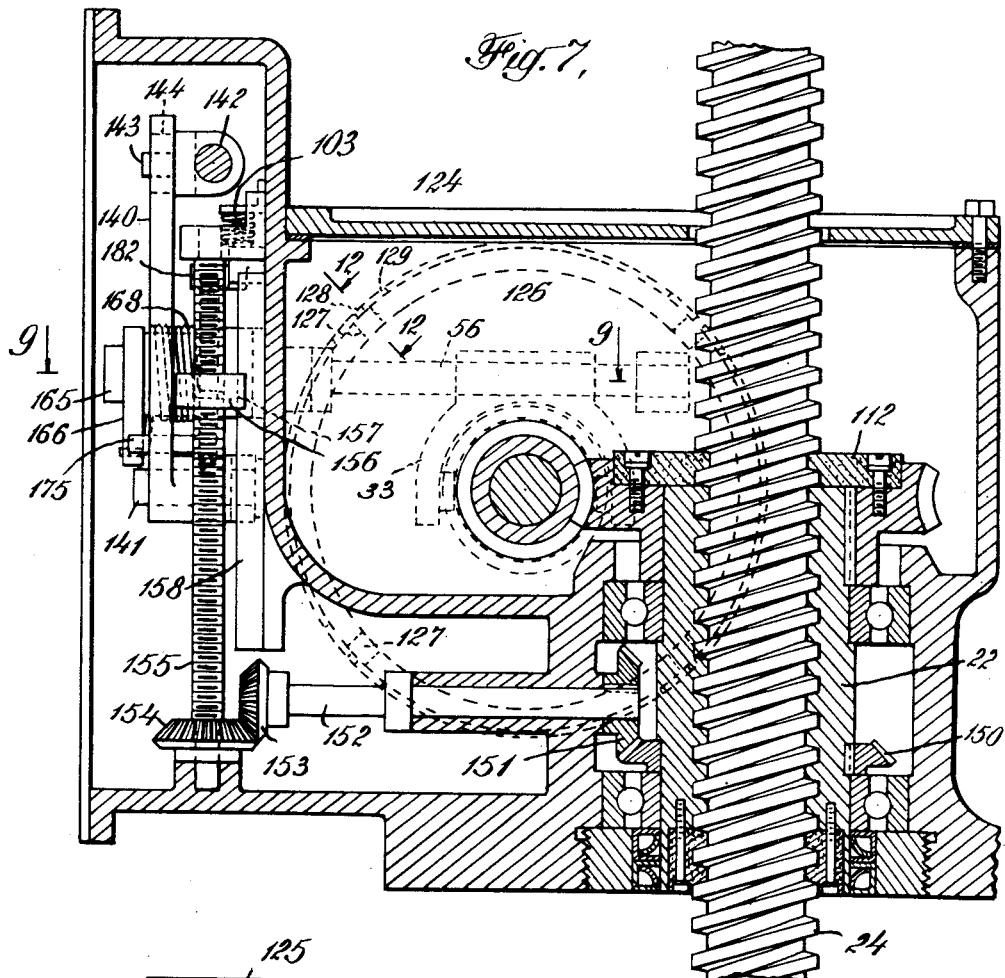
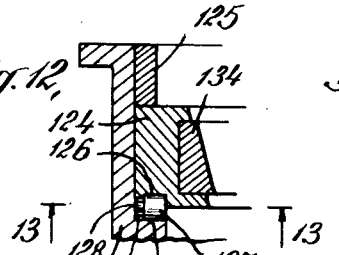
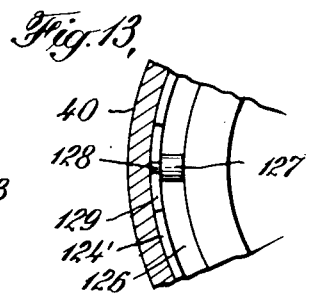

Oct. 21, 1941.   P. P. DEAN   2,259,437
CONTROL APPARATUS
Filed March 1, 1939   6 Sheets-Sheet 5
Fig. 8,
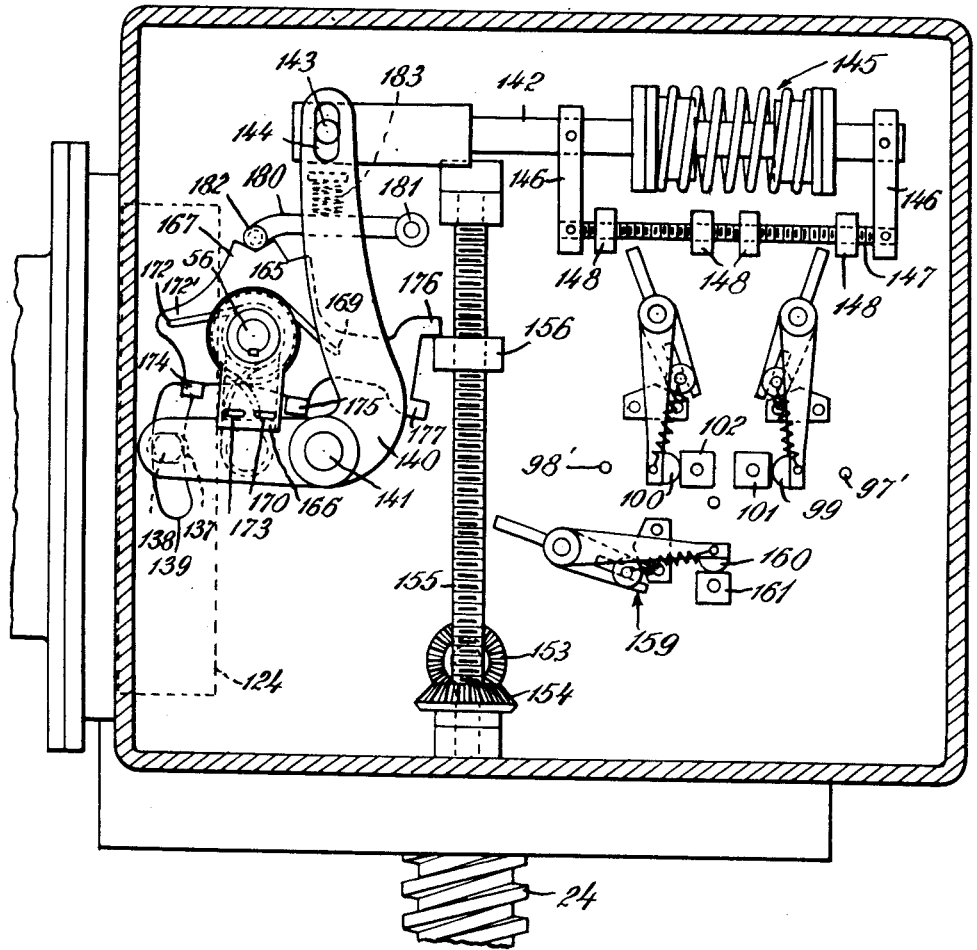
Fig. 10
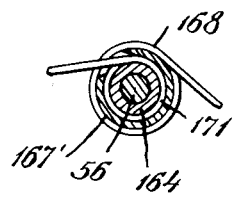
Fig. 11
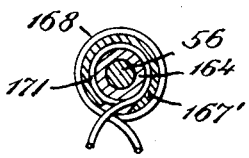
INVENTOR
Peter P. Dean
BY
Pennie Davis Marvin & Edmonds
ATTORNEYS INVENTOR
Peter P. Dean
BY Pennie Davis Marvin & Edmonds
ATTORNEYS Patented Oct. 21, 1941

2,259,437

UNITED STATES PATENT OFFICE 2,259,437

CONTROL APPARATUS

Peter P. Dean, Weston, Conn.

Application March 1, 1939, Serial No. 259,120

24 Claims. (Cl. 74—291)

This invention relates to control mechanism for power operated devices and more particularly to improvements in driving mechanism for devices having a limited movement such as valves, dampers, bulkhead doors and the like.

In my prior Patents Nos. 1,245,574, 1,325,005, 1,330,790 and 1,764,936 I have disclosed mechanism for the operation of valves, doors and the like wherein a driving member is connected to a driven member by means of suitable gearing and wherein the travel of the driven member is controlled by suitable torque mechanism operable by the driving member or by mechanism operable when the driven member has traveled a predetermined distance in either direction to disconnect the driving member from the source of power.

The present invention comprises generally improvements over the apparatus disclosed and claimed in my prior patents. In the constructions heretofore employed, motors or prime movers have been used of sufficient capacity to overcome the starting effort and to supply the amount of power necessary, for instance, to force a disc valve from its seat against unbalanced pressure. In the device forming the subject matter of the present application I utilize a reduction gear between the motor and the driven mechanism which gear is automatically operated at a certain point in the stroke to shift the drive from high speed to low speed. The change takes place just before the end of a closing stroke to supply increased power during the latter portion of the closing stroke and the apparatus remains in low gear after restarting in the opposite direction until the starting load has been reduced to normal. This permits the use of materially smaller motors than have heretofore been employed in such apparatus.

A further feature of the present invention is the provision of improved torque operating means for disconnecting the motor from its source of power. One method of accomplishing this is to employ the thrust movement of a driving worm to operate a switch. Heretofore this has necessitated the use of abnormally large springs arranged adjacent each end of the worm. These springs have very little movement or compression at light loads and are proportioned for maximum movement at maximum loads. In place of the two springs I employ a carrier arranged on the shaft adjacent the worm and connected to a suitable spring by leverage. This permits the use of a single spring and also permits the use of much lighter springs because of the leverage between the point where the thrust is applied to the carrier by the worm and the spring. The use of more flexible springs permits a construction wherein a larger spring movement is obtained and, in conjunction with the use of smaller motors, permits the use of limit switches in the motor line, thus eliminating the use of relays, and the like.

In the accompanying drawings I have shown several forms of the invention. In the drawings:

Fig. 1 is a plan view, parts being shown in section, of one form of the invention;

Fig. 2 is a transverse, sectional view of the gearing;

Fig. 3 is a detailed view of a portion of a clutch mechanism;

Fig. 7 is a vertical sectional view of the apparatus shown in Fig. 6;

Fig. 8 is a view similar to Fig. 5 showing the switch operating mechanism of the form of the invention shown in Fig. 6;

Figure 9:
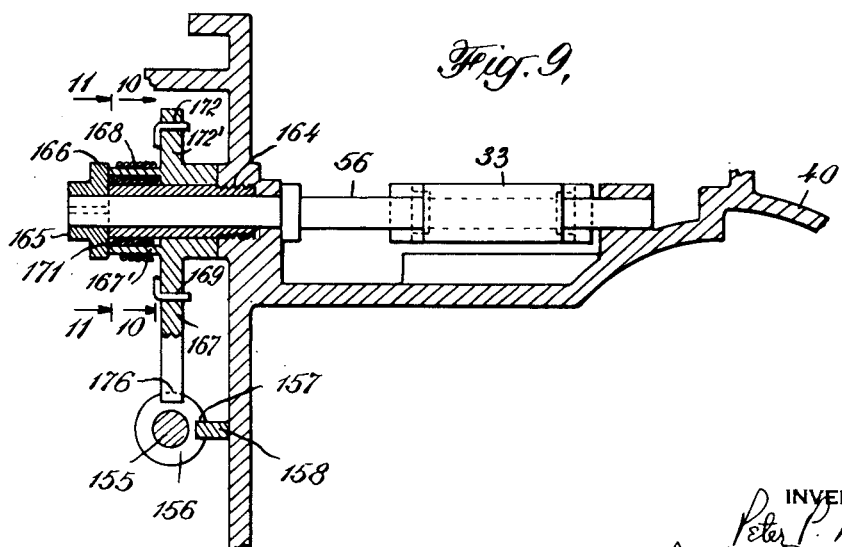
Fig. 9 is a section on the line 9—9 in Fig. 7.
Figure 14:
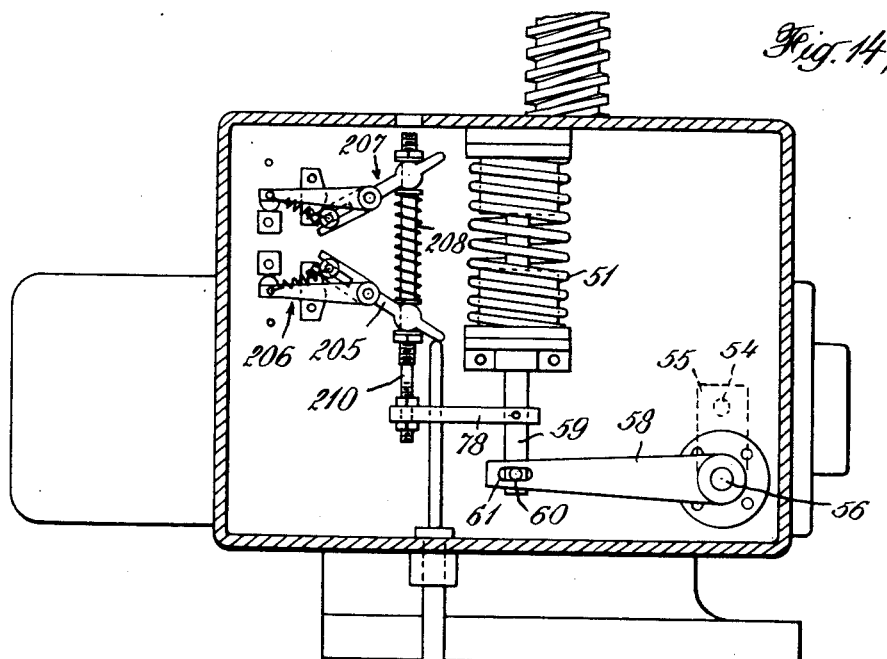
Figure 15:
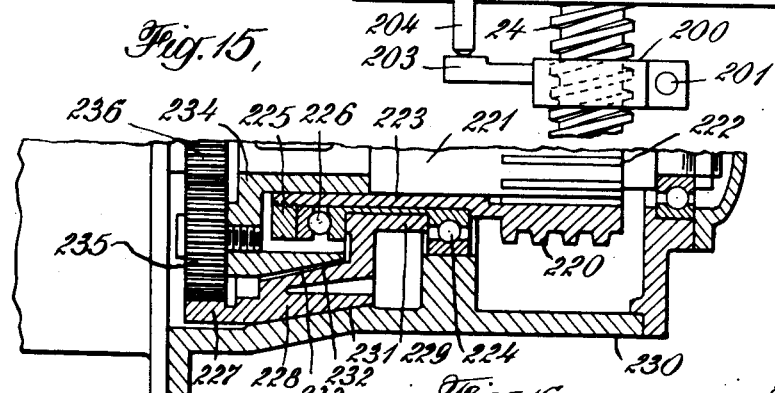
Figure 16:
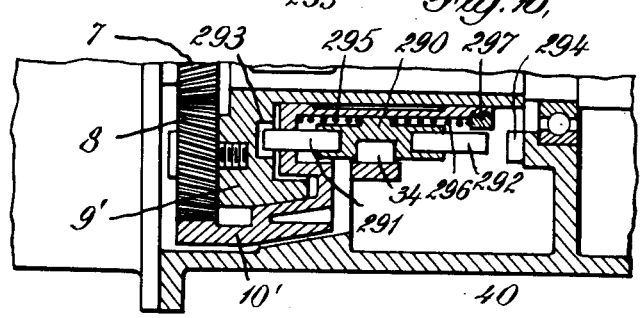

Figs. 10 and 11 are sections on the lines 10—10 and 11—11, respectively, in Fig. 9;

Fig. 12 is a section on the line 12—12 in Fig. 7;

Fig. 13 is a section on the line 13—13 in Fig. 12;

Fig. 14 is a vertical, sectional view of another form of the invention illustrating the control of the switches conjointly by the travel of the driven member and a torque controlled member;

Fig. 15 is a plan view, partly in section, of part of another form of the invention;

Fig. 16 is a plan view of part of still another form; and

Figure 17:
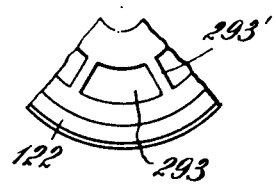

Fig. 17 is a detail view of part of the clutch mechanism shown in Fig. 16.

Referring to Figs. 1 to 5 of the drawings the reference numeral 1 designates generally a motor or other source of power from which the apparatus is to be driven. The base of the motor is provided with a flange 2 having openings adapted to be aligned with similar openings in a flange 3 formed on the casing 4 of the mechanism whereby the motor may be bolted to the casing by suitable bolts and nuts 5. The motor shaft 6 carries a helical pinion 7 which in turn drives a plurality of helical planetary pinions 8 carried by a spider 9. The pinions 8 mesh with a surrounding ring gear 10 forming the elements of a planetary drive. The spider 9 is provided with a hub 11 which is keyed at 12 to the driven shaft 13. Ring gear 10 likewise carries a hub 14 which surrounds the hub 11 and is free to rotate thereon.

In the ordinary planetary gearing the ring gear is fixed and when the planetary gears are driven from the central pinion, they revolve on their axes and also travel around the central gear in mesh with the ring gear. In the present construction I provide means whereby the ring gear may be fixed in this manner for operation at slow speed and further provide means whereby the ring gear may be locked to the spider so as to cause the parts to be driven at the speed of the drive shaft 6. As shown, the inner portion of the ring gear is provided with a friction surface 15, preferably conical, which is adapted to engage a similar surface 16 on the casing when the ring gear is in stationary position. Likewise the spider 9 is provided with a peripheral friction surface 17 which coacts with a similar surface 18 of the ring gear to lock the ring gear to the spider when the mechanism is driven at high speed.

Driven shaft 13 is provided with a worm 19 which is slidable thereon and connected to the shaft by means of a key or splines 20. This shaft drives a worm wheel 21 (see Fig. 4) which is keyed to an internally threaded sleeve 22 by a key 23. The sleeve 22 receives and operates a threaded rod 24 which may be connected to the valve, door or other mechanism to be operated in any suitable manner, for instance, as illustrated in Fig. 1 of my prior Patent No. 1,245,574. As stated, the apparatus is adapted to operate at high speed at the beginning of a closing stroke and is shifted to slow speed just prior to the actual closing of the door or valve when the maximum power is required. This valve shifting is automatically accomplished by the travel of the threaded shaft 24. A collar 25 is secured to threaded shaft 24 by a locking screw 26 and this collar has an inclined surface 27 which is adapted to contact with, and move an arm 28 as the shaft and collar move downwardly in Fig. 4 of the drawings. Arm 28 is mounted on a rock shaft 29 (see Fig. 3) and this shaft carries a second arm 30 which is adapted to engage a lever 31. Lever 31 is in turn carried by a shaft 32, the shaft 32 being mounted in suitable bearings and carrying a yoke member 33. This yoke is provided with pins 34 which are adapted to be received in a groove 35 on the hub 14 of the ring gear. Thus, when the collar 25 moves downwardly and the inclined surface 26 engages the rocker arm 28 to move it to its dotted line position shown in Fig. 4 of the drawings, shaft 32 is rotated to swing the yoke and move the ring gear from the position shown in Fig. 1 of the drawings with the friction surfaces 17 and 18 in engagement with each other and cause the friction surfaces 15 and 16 to engage each other, shifting the drive from high speed to low speed. Collar 25 retains the arm 28 in its position throughout the remainder of the closing stroke and throughout the beginning of the opening stroke when the starting load is on the motor. As the threaded shaft 24 moves upwardly disengaging the arm 28 from the collar 25, shaft 32 rotates in the opposite direction, under the action of a spring, or the like, not shown, to shift the gearing into high speed. Upon changing from high to low speed the movement is comparatively rapid so that the clutching action is instantaneous.

Figure 4:
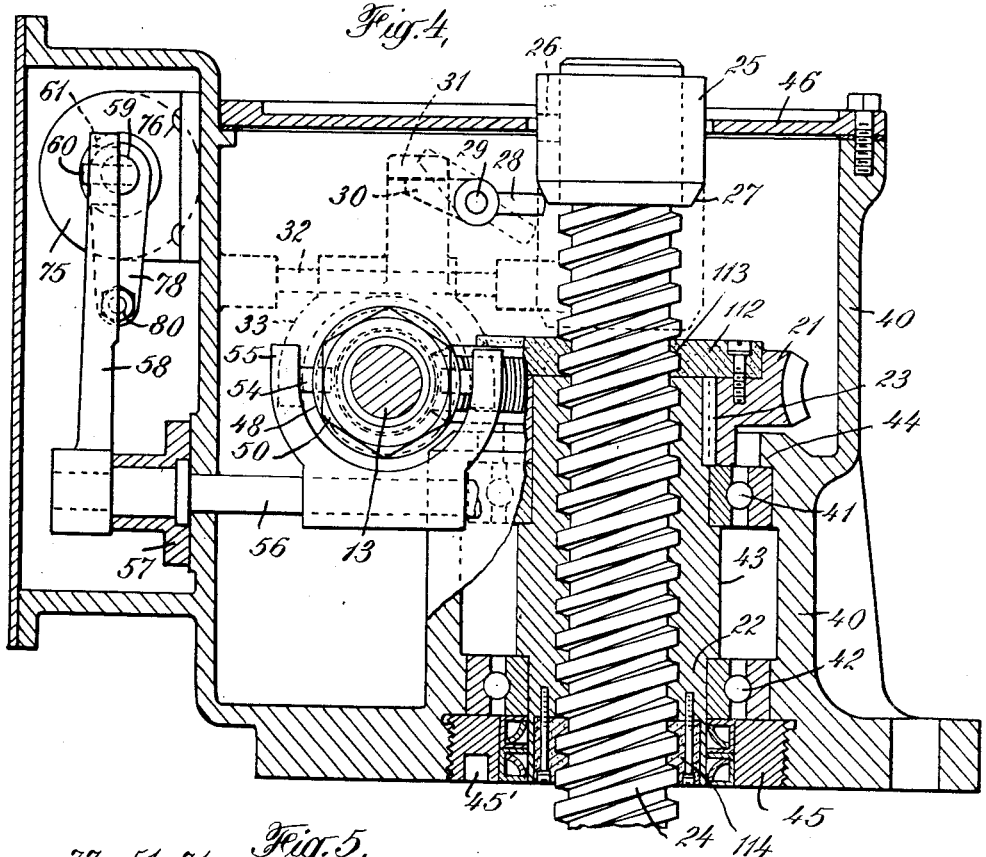
Fig. 4 is a vertical, sectional view of the apparatus shown in Fig. 1.

The main construction features are shown in Fig. 4 of the drawings. The threaded sleeve 22 and the threaded shaft 24 are mounted in a circular housing 40. Sleeve 22 is mounted in two sets of ball bearings 41 and 42 capable of absorbing both thrust and radial loads. As shown, the sleeve is provided with an enlarged portion 43 which engages these bearings and above the bearings 41 the casing is provided with an internal rib or flange 44 contacting with the bearing member as shown. The sleeve is locked in position by a nut 45 having wrench holes 45'. With this method of construction excessive loads are absorbed by the sleeve casing in both directions so that all covers and structure above the points of support of the threaded sleeve may be of light construction. A housing cover 46 is arranged at the top of the casing and may be removed for inspection of the operating parts.

Figure 5:
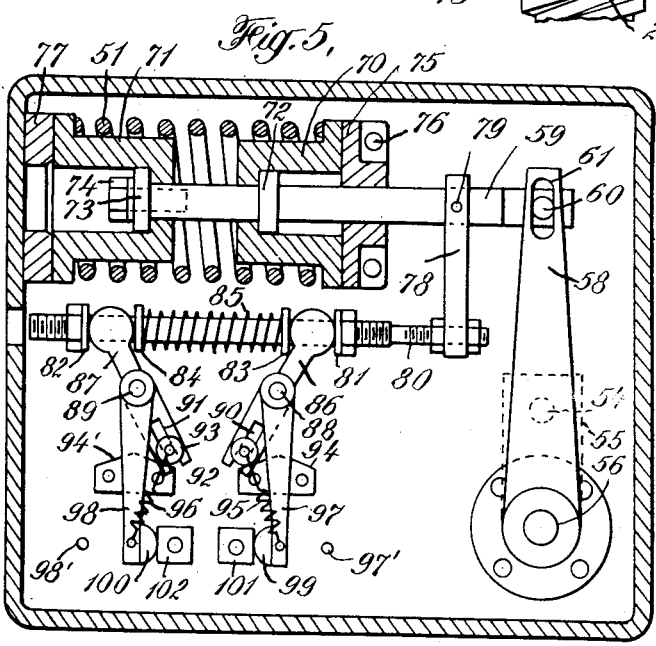
Fig. 5 is a sectional view at right angles to Fig. 4 showing the switches and the spring mechanism for operating them.

One means of operating the control switches by the torque of the driving worm is illustrated in Figs. 1, 4 and 5 of the drawings. Worm 19 is provided with a sleeve 47 and a carrier 48 is mounted upon a reduced portion 49 of this sleeve. The carrier is retained in position by a nut 50 threaded on the end of the sleeve. Movement of the sleeve in either direction therefore causes the carrier 48 to move with it. Such movement is normally resisted by a spring 51 (see Fig. 5) so that when there is no load on the apparatus the carrier 48 retains the worm in central position. The carrier 48 is provided with a member 52 supported in the carrier by anti-friction thrust bearings 53. Member 52 is provided with a groove for the reception of pins or projections 54 carried by yoke 55 (see Fig. 4) and this yoke is secured to a shaft 56 mounted in suitable bearings in the machine, one of which is shown at 57. Shaft 56 extends through the wall of the casing 40 and carries a lever 58. Lever 58 is connected to a shaft or rod 59 (Fig. 5) by means of a pin 60 carried by the rod 59 and operable in a slot 61 near the end of the lever. Rod 59 is provided with a pair of spring carriers 70 and 71 on which the spring 51 is mounted. As shown, the rod is provided with an enlargement or collar 72 to engage the spring carrier 70 and is provided with a collar 73 adjacent its end which is held in position by a nut 74 and which engages the spring carrier 71. End plate 75 is attached to the casing of the machine by bolts 76 and supports the carrier 70 whereas the carrier 71 is supported by a plate 77 mounted on the inner wall of the casing. A carrier 78 is connected to the rod 59 by a pin 79 to move switch actuating rod 80 which is carried thereby when the rod 59 is moved. Switch actuating rod 80 is provided with a pair of collars 81 and 82 adjacent its opposite ends and is further provided with a pair of movable collars or washers 83 and 84. A coil spring 85 surrounds the rod between the slidable collars 83 and 84. Between each of the collars 81 and 83 and the collars 82 and 84 switch actuating rod 80 receives levers 86 and 87 which are pivotally mounted at 88 and 89, respectively. The ends of the levers 86 and 87 are slotted as at 90 and 91 and receive rollers 92 and 93, respectively, which rollers ride on inclined guides 94 and 94' formed on plates secured to the casing of the machine. Springs 95 and 96 are connected to these rollers, the opposite ends of the springs being connected to switch levers 97 and 98. Contacts 99 and 100 are carried by the switch levers and are adapted to engage stationary contacts 101 and 102.

Switches 99—101 and 100—102 are arranged in the control circuit of a reversing motor in any suitable manner to control the operation of the motor. One such means is shown in my prior Patent No. 1,245,574.

When the torque of the sleeve 47 moves the carrier 48 in either direction, shaft 56 is swung upon its pivot moving the lever 58 and thus causing one of the carriers 70 and 71 to be moved against the tension of spring 51. The movement of rod 59 moves the switch actuating rod 80 causing one of the rollers 92 and 93 to move upwardly on its guide 94 or 94' until the roller rides over the top of the guide at which moment the spring 95 or 96 passes dead center and opens the contacts 99—101 or 100—102 to interrupt the circuit. The switches are limited in their movement by stops 97' and 98', and each switch is restored to its closed position by spring 85. Spring 85 cannot restore the switch to its closed position until the motor starts in the opposite direction and the load on spring 51 is released by the movement of the worm 19 toward the "no load" position.

I further provide means for lubricating the threaded shaft 24. As shown in Figs. 1 and 4, one face of the worm wheel 21 is recessed for the reception of a felt washer 112. The felt washer is provided with a central opening through which the threaded shaft 24 passes, and the surface of this opening is shaped as at 113 to receive the threads. The washer 112 is maintained saturated with oil thrown by the worm during operation. The surface of this washer bearing against the shaft 24, therefore, keeps the shaft lubricated and also removes excess oil and prevents the oil from seeping along the shaft 24. If desired, an additional wiping washer 114 may be fitted closely around shaft 24 in the lower end of sleeve 22. It will be observed that the worm wheel 21 and the traveling worm 19 are housed in a chamber 40' to prevent the oil from reaching the friction clutches.

In Figs. 6 to 13, inclusive, I have illustrated a modified form of apparatus including torque responsive means wherein the movement of the ring gear of the clutch is relied upon in place of the worm for operating the switches. The drive gear and planetary gears are similar to those described in connection with Fig. 1 of the drawings and are designed by the same reference numerals 7 and 8, respectively. The planetary gears are carried by a spider 122 and surrounded by a ring gear 123 with which they mesh. In this form, however, the ring gear 123 is surrounded by a friction member 124 which is capable of limited rotational movement in the casing 40 and is retained against endwise movement by a spacer 125. Friction member 124 is provided with an annular recess 126 on its lower face, and friction rollers 127 are spaced circumferentially around the recess and serve as bearings between the member 124 and an annular shelf 124' in the casing 40. Each roller 127 is formed with an axial projection 128 extending into a groove 129 in the friction member 124, as shown in Figs. 12 and 13, the projections 128 serving to maintain the rollers at the desired circumferential spacing. Frictional clutching of the ring 123 and the friction member 124 to restrain movement of ring 123 is caused by a ring 134 of a molded composition arranged in a recess in the face of friction member 124. Likewise, a similar friction ring 135 may be arranged in the clutching face of the spider 122 to insure proper frictional engagement between the spider and the ring when the apparatus is in high gear.

The friction member 124 is further provided with an elongated recess 137 in its periphery, the recess being elongated in the direction of the axis of the member 124. The recess 137 receives a projecting stud 138 which extends outwardly through an arcuate slot 139 in the casing, the outer end of the stud being secured to one arm of a bell crank lever 140. The lever 140 is pivotally mounted on a pin or stud 141 carried by the frame of the machine, and its other arm is connected to a switch rod 142 by means of a pin 143 projecting from the rod through an elongated opening 144 in the bell crank lever. The rod 142 is movable endwise by the bell crank lever in either direction, its movement being opposed by a spring assembly 145 generally similar to the spring assembly 51 shown in Fig. 5. Mounted on the rod 142 in spaced relation are two arms 146 which carry at their lower ends a threaded rod 147. Adjustment nuts 148 on the threaded rod are arranged in two pairs, each of which is adapted to actuate one of the switches 99—101 and 100—102.

When the clutch is in the low-speed position just prior to the end of the stroke, with the ring 123 engaging the friction ring 134, the torque of the ring 123 is transmitted to the friction member 124. When this torque is sufficient to overcome the force of the spring assembly 145, the bell crank lever 140 is moved by member 124 towards one end of the slot 139, depending on the direction of rotation of the member 123. Assuming that the bell crank lever is moved counterclockwise, as seen in Fig. 8, the rod 142 is moved to the left and causes the adjustment nut 148 at the extreme right end of shaft 147 to engage the actuating mechanism of switch 99—101, continued movement of the parts causing this switch to open. It will be understood that if the drive is in the opposite direction, the lever 140 is moved in a clockwise direction and results in opening of switch 100—102 by the adjustment nut 148 at the extreme left end of shaft 147.

The operation of the switches 99—101 and 100—102, shown in Fig. 8, differs from the operation of the switches shown in Fig. 5. In the apparatus shown in Figs. 1 to 5, the worm 19 remains in the position to which it is moved by the torque after the stopping of the motor, thereby retaining the spring 51 under compression and maintaining the switch 99—101 or 100—102 in open position until after the motor is started in the opposite direction. When the torque of the ring gear, however, is relied upon to operate the switches, the ring gear is relieved of strain and returns to its neutral position when the motor stops. The switch 99—101 or 100—102 would, therefore, close so as to restore the original circuit and allow the motor to start in the same direction when the reversing switch (not shown) is closed, unless means were provided to cause the switch to remain in an open position until after the motor is reversed.

In the operation of the switches 99—101 and 100—102 shown in Fig. 8, when one of the switches has been opened, as described, it remains in its open position even after the rod 142 is returned to its neutral position by spring 145 on disconnection of the power, because the inner adjustment nuts 148 are not adapted to close the switch until the torque reaction of the motor in the opposite direction causes rod 142 to move to the opposite side of the neutral position. If desired, an auxiliary spring, not shown, may be used in conjunction with spring 145 to reset the switches in the event that the torque load developed on reversal of the motor is insufficient.

Figure 6:
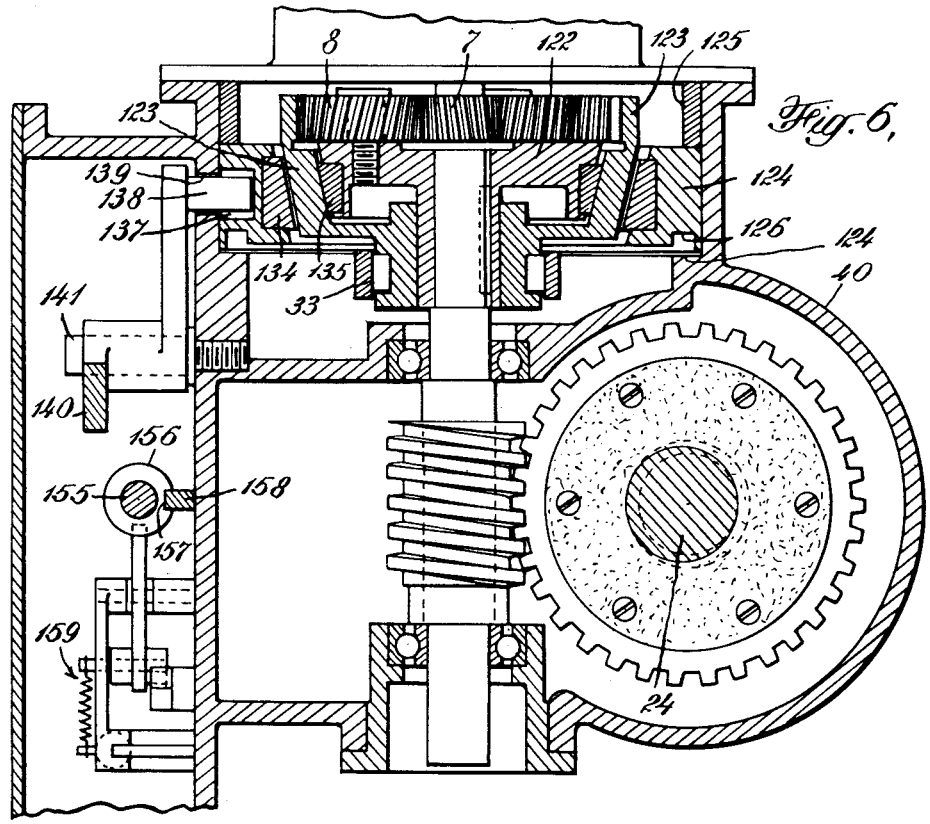
Fig. 6 is a plan view partly in section of another form of the invention.

It will be apparent that torque of the helical gears 120 and 121 can only be employed for throwing a limit switch when the friction member 124 and ring 123 are in engagement. In order to obtain actuation of a limit switch when the clutch is in high gear, as shown in Fig. 6, I provide an additional switch adapted to be actuated in accordance with the travel of the driven member. As shown in Fig. 7, the sleeve 22 is provided with a bevel gear 150 meshing with a gear 151 on one end of a shaft 152. The opposite end of the shaft 152 is provided with a bevel gear 153 meshing with a bevel gear 154 on a threaded shaft 155. Shaft 155 is mounted in suitable bearings and carries a nut 156 provided with a slot 157 (Fig. 9) which receives a key 158 mounted on the frame of the machine. Rotation of shaft 155, therefore, causes the nut 156 to travel along it. The nut 156 is adapted to engage a switch actuating mechanism 159, similar to the snap acting means of the switches 99—101 and 100—102, and thereby open and close contacts 160 and 161, depending on the direction of movement of the nut 156.

The clutch mechanism is adapted to be shifted from high speed to low speed by means shown particularly in Figs. 7, 8, and 9. As there shown, the shaft 56, which is adapted to actuate the ring member 123 through the yoke 33 has one end mounted in a bearing 164 threaded into the casing. A collar 165 carrying a lever 166 is keyed to the upper end of the shaft. A tripping plate 167 is arranged on the bearing sleeve 164 and is provided with a hub 167' projecting outwardly from the plate and spaced from the bearing sleeve. A spring 168 is wound on the outside of the hub 167', one end of the spring being secured in an opening 169 in the tripping plate, the other end being anchored in a slot 170 in the lever 166. A similar spring 171 is coiled between the hub 167' and the bearing member 164 and has one end secured in an opening 172 on an extension 172' of the tripping plate 167. The opposite end of this spring is secured in a slot 173 of lever 166. The plate 167 is provided with a pair of extensions 174 and 175 which are adapted to engage the sides of lever 166. The outer end of plate 167 is forked to provide contact members 176 and 177 engageable by the nut 156.

As the threaded shaft 155 is rotated from sleeve 22 by the bevel gears 150 and 151, shaft 152, and bevel gears 153 and 154, the nut 156 is caused to travel along the shaft. As the nut contacts the forked end of the tripping plate 167, it causes the plate to move on the sleeve 164 until extension 174 comes in contact with lever 166. Continued movement causes the clutch to be shifted to its opposite position through turning of the shaft 56 and yoke 33 by the lever 166. It will be apparent that when the shaft 155 is rotated in the opposite direction to cause the nut 156 to engage the other bifurcation of the tripping plate 167, the other extension 174 is moved into engagement with lever 166 and acts through the lever, the shaft 56, and yoke 33 to shift the clutch to the opposite position. The clutch is locked in either position by lever 180 which is pivotally mounted at 181 and provided with a roller 182 on its outer end adapted to engage notches formed on an extension of the tripping plate 167. The roller 182 is held in either one of the notches by a coil spring 183.

It will be observed that with this construction, the nut 156 serves to actuate the clutch mechanism through the tripping plate 167 in accordance with the travel of the driven member as determined by rotation of the shaft 155, and also serves to actuate the limit switch 159 when the motor has reversed and caused the nut to move downwardly, as seen in Fig. 8. The clutch mechanism is operated positively through the plate 167 by reason of the action of the coil springs 168 and 171, and the latter prevent the clutch from remaining in a neutral position and assure that it is always in engagement with one of its coacting members.

In both forms of the aparatus heretofore described, the helical gears 7 and 8 perform a desirable function in that they cause a rapid shifting of the clutch and thereby prevent idling during the shifting operation. That is, the helical gears as they revolve produce an axial thrust of an amount determined by the helix angle of their teeth and in a direction determined by the direction of rotation of the driving pinion 7. Thus, when the driven member connected to shaft 24 is approaching the end of its travel and ring gear 10 is moved by yoke 33 to disengage surfaces 17 and 18, the direction of rotation of the helical gears is such that the gears 8, which will now commence to rotate on gear 10, exert a thrust on the latter which is downward, as seen in Fig. 1, and this thrust supplements the action of the relatively slow-moving yoke 33 and throws the ring gear 10 quickly into engagement with surface 16. This rapid movement of the clutch is possible because of the play or slack in the connection between the yoke 33 and the arm 28. When the motor is reversed, the thrust of gears 8 on ring 10 tends to raise the ring from surface 16, as seen in Fig. 1, and accordingly when the ring 10 is moved away from surface 16 on disengagement of arm 28 by collar 25, this thrust aids in snapping the ring back into engagement with the spider. The action of the helical gears in the form shown in Figs. 6 to 13 is similar as will be readily apparent.

The apparatus heretofore described may be employed for many purposes. While it has been described in connection with the movement of a traveling member in the form of a threaded shaft, in many applications the mechanism to be operated may require rotary motion instead of longitudinal movement, and this rotary motion may be obtained by substituting suitable mechanism for the threaded sleeve 22 and the threaded rod 24 in Fig. 4. Likewise, in some applications, other types of clutches than the friction clutches heretofore described may be employed. When the limit switches are controlled by the torque of a worm, the switches may be actuated by torque upon movement of the apparatus in either direction, as described in connection with the form of the invention shown in Figs. 1 to 5. The torque-operated switch mechanism of Figs. 1 to 5, however, may be employed for control of one of the limit switches in conjunction with a suitable travel control mechanism, as shown in Fig. 14. As there shown, the threaded shaft 24 has a threaded collar 200 mounted thereon and adjustable on the shaft to permit the stroke of the apparatus to be adjusted for different applications. The collar is clamped to the shaft in the desired position by a bolt 201. The collar carries an arm 203 adapted to engage one end of a push rod 204 which contacts at its opposite end a rocker arm 205 forming part of a snap-switch mechanism 206 similar to the snap mechanism of the switches 99—101 and 100—102.

If desired, a second similar switch 207 may be arranged to be actuated by another collar (not shown) mounted near the top of the shaft 24 as seen in Fig. 14, so that one of the switches is opened during the upward movement of the shaft and the other opened during the downward movement. The switches 206 and 207 may be closed, upon disengagement of the corresponding collar from its push rod, by a spring assembly 208 disposed between the switches and normally urging them toward their closed positions.

The switch 206 is also operable by the torque mechanism shown in Figs. 1 and 5. As shown, the lever 58 of this torque mechanism is connected to the rod 59 through a pin 60 extending through a slot 61 in the lever, and movement of the rod 59 in either direction is resisted by the spring assembly 51. The rod 59 is connected through arm 78 to a threaded stem 210 which bears at its upper end against a part of the rocker arm 205. Accordingly, assuming that the torque of the worm 19 (Fig. 1) causes lever 58 to move in a clockwise direction, as seen in Fig. 14, the arm 78 raises stem 210 and acts through rocker arm 205 against the action of spring assembly 208 to open the switch 206. The switch will be held in its open position by worm 19 until the motor is reversed, whereupon lever 58 moves in a counterclockwise direction and lowers stem 210 so that the spring assembly 208 can return the switch to its closed position.

In Fig. 15 of the drawings I have illustrated a drive mechanism in which the stroke in one direction is at high speed and the stroke in the opposite direction at low speed with the gearing automatically shifted from high speed to low speed at the end of the stroke. In this form a worm 220 (similar to the worm 19) is slidably mounted on a shaft 221 by splines 222. Worm 220 is formed on a sleeve 223 and this sleeve is reduced in cross section, the reduced portion being received in ball bearings 224 which are slidably mounted in the casing and which contact with the shoulder formed by the reduction in the diameter of the sleeve. A lock nut 225 is arranged on the end of this sleeve and contacts with a second set of ball bearing 226 surrounding the reduced portion of the sleeve. Ring gear 227 is provided with an extension 228 and this extension carries a circular member or ring 229 which is arranged between the ball bearings 224 and 226. The casing 230 is provided with a friction surface 231 adapted to be engaged by a similar friction surface formed on the extension 228 of the ring gear. Likewise the inner face of the extension 228 is provided with a friction surface 232 to cooperate with a similar friction surface 233 formed on the spider 234. Spider 234 carries planetary gears 235 which mesh with the drive gear 236. In operation when the shaft 221 is rotating in one direction, the worm creates a thrust on ball bearings 224 which move against the ring 229 and thus move the ring gear 227 to disengage the friction surface on the casing and cause engagement of friction surfaces 232 and 233 to lock the ring gear to the spider for high speed. When the motor travels in the opposite direction, the worm 221 creates a thrust on the bearings 226 through the lock nut 225 causing the bearings 226 to force the ring gear to move in a right-hand direction in Fig. 15 of the drawings, thus disengaging the friction surfaces 232 and 233 and engaging the friction surface 231 with its coacting surface on the casing to lock the ring gear to the casing for slow speed drive. Anti-friction thrust bearings may be provided to absorb the thrust.

For some special requirements it is advisable to use a clutch that may be locked against slippage under extreme loads and such construction is shown in Fig. 16 of the drawings. The gearing shown in Fig. 16 is substantially the same as that shown in Fig. 1 of the drawings and the same reference numerals are applied thereto. A clutch shifting collar 290 carried by and keyed to the ring gear 10' is provided with one or more pins 291 projecting toward the spider 9' and one or more pins 292 projecting in the opposite direction. The spider is provided with a radial groove 293 having one or more stops 293' therein (Fig. 17) and an adjacent part of the casing 40 is provided with one or more stops 294. A coil spring 295 is arranged between the collar 290 and the spider 9' and a similar coil spring 296 is arranged on the opposite side of the collar, abutting the collar and a nut 297. Operation of the apparatus shown in this figure is as follows:

In the high speed position shown in the drawings, pin 291 projects into slot 293 and engages a stop 293' in this slot against which it abuts. The pin, being carried by the collar which forms a part of the structure of the ring gear, therefore positively locks the ring gear to the spider. When the clutch is shifted toward low speed position, the pin 34 moves toward the right, as seen in Fig. 16, and causes pin 291 to move out of slot 293. When the ring gear is thus disconnected from the spider, the thrust caused by the helix angle of the gear acts through compressed spring 295 and causes the collar 290 to snap from the high speed position to the low speed position bringing the friction facings on the interior of the casing and on the periphery of the ring gear into engagement with each other. This movement compresses the spring 296 and causes pin 292 to come in line with stop 294, and if the movement of the ring gear is not entirely stopped by the friction surfaces, its movement is stopped when pin 292 engages the stop 294 locking the ring gear to the casing for low speed operation.

I claim:

1. In apparatus of the character described, a driving member, a driven member, gearing connecting the driving member to the driven member and operable to cause the driven member to be driven at either of two speeds, gear shifting means operatively associated with said gearing, a traveling member connected to the driven member to be moved a given distance thereby in either direction, and means operable by the traveling member near one end of its movement for actuating said gear shifting means.

2. In apparatus of the character described, a driving member, a driven member, planetary gearing connecting the driving member to the driven member, said planetary gearing including a spider and a ring gear, the ring gear being adapted to be restrained to drive the driven member at low speed and being further adapted to be locked to the spider to drive the driven member at the speed of the driving member, a traveling member carried by the driven member, and means operable by the traveling member for shifting the ring gear from one position to the other.

3. In apparatus of the character described, a driving member, a driven member, planetary gearing connecting the driving member and the driven member, said planetary gearing comprising a pinion on the driving member, a spider having a hub keyed to the driven member, pinions on the spider meshing with the pinion on the driving member, a ring gear surrounding said last named pinions and meshing therewith, means for restraining rotation of the ring gear to drive said driven member at low speed, means for locking the ring gear to the spider for driving the driven member at high speed, a traveling member connected to said driven member, and means operable by the traveling member for shifting said ring gear from one position to the other.

4. In apparatus of the character described, a casing, a driving member, a driven member within the casing, a pinion on the driving member, a spider having its hub keyed to the driven member, driven pinions carried by the spider and meshing with said first mentioned pinion, a ring gear meshing with said driven pinions, said ring gear and the inner surface of the casing being provided with cooperating friction surfaces to restrain the ring gear from rotating, said spider and said ring gear being provided with friction surfaces to cause said ring gear to rotate with said spider, a traveling member connected to the driven member, and means operable by the traveling member for moving said ring gear into position to cause either of said pairs of friction surfaces to engage each other.

5. In apparatus of the character described, a casing, a driving member, a driven member within the casing, a pinion on the driving member, a spider having its hub keyed to the driven member, driven pinions carried by the spider and meshing with said first mentioned pinion, a ring gear meshing with said driven pinions, said ring gear and the inner surface of the casing being provided with cooperating friction surfaces to restrain the ring gear from rotating, said spider and said ring gear being provided with friction surfaces to cause said ring gear to rotate with said spider, a traveling member connected to the driven member, a hub on the ring gear, a yoke engaging said hub, and means controlled by the traveling member to swing said yoke and shift the ring gear into either of said two positions.

6. In apparatus of the character described, a casing, a driving member, a driven member within the casing, a pinion on the driving member, a spider having its hub keyed to the driven member, driven pinions carried by the spider and meshing with said first mentioned pinion, a ring gear meshing with said driven pinions, said ring gear and the inner surface of the casing being provided with cooperating friction surfaces to restrain the ring gear from rotating, said spider and said ring gear being provided with friction surfaces to cause said ring gear to rotate with said spider, a traveling member connected to the driven member, a collar mounted on the traveling member, a rock shaft arranged adjacent the traveling member, an arm mounted on the rock shaft and adapted to engage the collar to rock the shaft, and means associated with said rock shaft for shifting the ring gear into engagement with either of said surfaces on the casing and the spider.

7. In apparatus of the character described, a casing, a driving member, a driven member within the casing, a pinion on the driving member, a spider having its hub keyed to the driven member, driven pinions carried by the spider and meshing with said first mentioned pinion, a ring gear meshing with said driven pinions, said ring gear and the inner surface of the casing being provided with co-operating friction surfaces to restrain the ring gear from rotating, said spider and said ring gear being provided with friction surfaces to cause said ring gear to rotate with said spider, a traveling member connected to the driven member, a collar mounted on the traveling member, a rock shaft arranged adjacent the traveling member, an arm mounted on the rock shaft and adapted to engage the collar to rock the shaft, a hub formed on the ring gear a yoke engaging said hub, and means controlled by said rock shaft to swing the yoke and shift the ring gear from one position to the other.

8. In apparatus of the character described, a driving member, a driven member, gearing connecting the driving member and the driven member and operable to cause the driven member to be driven at either of two speeds, a worm associated with the driven member, a worm wheel meshing therewith, an internally threaded sleeve driven by said worm wheel, a threaded shaft mounted therein, and means carried by the threaded shaft for shifting said gearing from one speed to the other upon movement of said shaft.

9. In an apparatus of the character described, a driving member, a driven member, planetary gearing connecting said members, said planetary gearing including a spider and a ring gear, the ring gear being adapted to be restrained to drive the driven member at low speed and locked to the spider for driving the driven member at high speed, a worm associated with the driven member, a worm wheel meshing therewith, an internally threaded sleeve driven by said worm wheel, a threaded shaft extending through said sleeve, a lever arranged adjacent said shaft, and operable by the movement thereof, and a yoke connected to said lever and to said ring gear to shift the ring gear into either of two positions.

10. In an apparatus of the character described, a driving member, a driven member, gearing connecting the driving member and the driven member and operable to cause the driven member to be driven at either of two speeds, a traveling member connected to the driven member, means operable by the traveling member for shifting said gearing, switch means for controlling said driving member, and means operated by the traveling member for actuating said switch means.

11. In apparatus of the character described, a driving member, a driven member, planetary gearing connecting the driving member to the driven member, said planetary gearing including a spider and a ring gear, the ring gear being adapted to be restrained to drive the driven member at low speed and being further adapted to be locked to the spider to drive the driven member at the speed of the driving member, a traveling member connected to the driven member, means operable by the traveling member for shifting the ring gear from one position to the other, switch means for controlling said driving member, and means operated by the traveling member for actuating said switch means.

12. In apparatus of the character described, a motor having a drive shaft, a driven shaft, gearing connecting the motor shaft to the driven shaft, a worm slidably mounted on the driven shaft, a worm wheel driven by the worm and with reference to which the worm is movable on the driven shaft by torque reaction of the worm, a carrier abutting the worm, a yoke operable by said carrier, a lever operatively connected to said yoke, a rod connected to the lever, a spring surrounding said rod, members carried by said rod and operable to compress the spring upon movement of the rod in either direction, and switch operating means connected to said rod.

13. In apparatus of the character described, a motor having a drive shaft, a driven shaft, gearing connecting the motor shaft to the driven shaft, a worm slidably mounted on the driven shaft, a worm wheel driven by the worm and with reference to which the worm is movable on the driven shaft by torque reaction of the worm, a carrier abutting the worm, a yoke operable by said carrier, a lever operatively connected to said yoke, a rod connected to the lever, spring means surrounding said rod, stops for the spring means, collars carried by the rod and engaging the opposite ends of the spring means to compress said means against one of the stops upon movement of the rod in either direction, and switch operating means connected to the rod.

14. In an apparatus of the character described, a motor shaft, a pinion on said shaft, a spider, a plurality of pinions carried by the spider and meshing with said first mentioned pinion, a ring gear meshing with said last mentioned pinions, a friction member surrounding the ring gear, means for frictionally connecting the friction member to the ring gear to transmit the torque of the ring gear to the friction member, a lever connected to the friction member, a rod connected to the lever, spring means connected to the rod whereby movement of the rod in either direction compresses the spring means, and switch operating means connected to the rod.

15. In an apparatus of the character described, a motor shaft, a pinion carried thereby, a spider, pinions carried by the spider and meshing with said first mentioned pinion, a ring gear meshing with said last mentioned pinions, a friction member surrounding the ring gear, said friction member being provided with a slot, a stud carried by the casing and received in the slot, a lever connected to the stud, a rod connected to the lever, spring means connected to the rod and adapted to be compressed upon movement of the rod in either direction, and switch operating means associated with the rod.

16. In an apparatus of the character described, a casing, a drive shaft, a driven shaft within the casing, a pinion mounted on the drive shaft, a spider keyed to the driven shaft, pinions carried by the spider and meshing with the pinion on the drive shaft, a ring gear meshing with the pinions on the spider, means for coupling the ring gear to the spider and means for coupling the ring gear to the casing, a worm slidably mounted on the driven shaft, and adapted to drive a worm wheel with reference to which the worm is movable on the shaft by torque reaction, bearings slidable in the casing and abutting the worm to receive the thrust of the worm, said bearings engaging opposite sides of a part of the ring gear to shift it into engagement with the spider or the casing.

17. In an apparatus of the character described, a casing, a drive shaft, a driven shaft in the casing, a pinion mounted on the drive shaft, a spider keyed to the driven shaft, pinions carried by the spider and meshing with said first mentioned pinion, a ring gear meshing with the pinions on the spider, the interior of the casing and the exterior of the ring gear being provided with friction surfaces adapted to restrain movement of the ring gear when said surfaces are in engagement, said spider and the ring gear being provided with friction surfaces adapted to couple the ring gear to the spider to rotate therewith when said surfaces are in engagement, a worm slidable on the driven shaft and adapted to drive a worm wheel with reference to which the worm is movable on the shaft by torque reaction, bearings slidably mounted in the casing and adapted to receive the thrust of the worm, said bearings engaging opposite sides of a part of the ring gear to shift the ring gear from one position to the other.

18. In apparatus of the character described, a casing, a driving member, a driven member within the casing, a pinion on the driving member, a spider having its hub keyed to the driven member, pinions carried by the spider and meshing with said first mentioned pinion, a ring gear meshing with the pinions on the spider, means for locking the ring gear to the spider, means for locking the ring gear to the casing, a travelling member connected to the driven member, and means operable by the travelling member for moving said ring gear into position to cause one of said locking means to lock the ring gear to the spider or to the casing.

19. In apparatus of the character described, a casing, a driving member, a driven member within the casing, a pinion on the driving member, a spider having its hub keyed to the driven member, pinions carried by the spider and meshing with said first mentioned pinion, a ring gear meshing with the pinions on the spider, a friction ring mounted for rotation in the casing and adapted to engage the ring gear, a friction ring adapted to lock the ring gear to the spider for rotation therewith, a travelling member connected to the driven member, and means operable by the travelling member for moving said ring gear in position to cause either of said friction rings to lock the ring gear to the casing or to the spider.

20. In apparatus of the character described, a driving member, a driven member, gearing connecting the driving member to the driven member and operable to cause the driven member to be driven at either of two speeds, a travelling member connected to the driven member, a threaded shaft operatively connected to the travelling member, a nut mounted on said shaft and restrained against rotation whereby rotation of the shaft causes longitudinal movement of the nut, and means for shifting said gearing operable by the movement of said nut.

21. In apparatus of the character described, a driving member, a driven member, planetary gearing connecting said members including a gear on one member, a spider keyed to the other member, pinions on the spider meshing with said gear, and a ring gear surrounding said pinions and meshing therewith, said gears and pinions having helical teeth, and the ring gear being movable axially into a low speed position for restraining rotation of the ring gear and a high speed position for locking the ring gear to the spider, a travelling member connected to the driven member, and means operable on movement of the travelling member to near the end of its travel for shifting the ring gear from its high speed to its low speed position, the helical teeth on the pinions causing a thrust on the ring gear supplementing the action of said means to move the ring gear rapidly into its low speed position.

22. In apparatus of the character described, a driving member, a driven member, planetary gearing connecting said members including a gear on one member, a spider keyed to the other member, pinions on the spider meshing with said gear, and a ring gear surrounding said pinions and meshing therewith, the ring gear being movable into a low speed position for restraining rotation of the ring gear and a high speed position for locking the ring gear to the spider, control means for the driving member operable by torque of the ring gear when the ring gear is in the low speed position, a travelling member connected to the driven member, and control means for the driving member operable by the travelling member when the ring gear is in high speed position.

23. In apparatus of the character described, a driving member, a driven member, planetary gearing connecting said members including a gear on one member, a spider keyed to the other member, pinions on the spider meshing with said gear, and a ring gear surrounding said pinions and meshing therewith, the ring gear being movable into a low speed position for restraining rotation of the ring gear and a high speed position for locking the ring gear to the spider, control means for the driving member operable by torque of the ring gear when the ring gear is in the low speed position, a travelling member connected to the driven member, control means for the driving member operable by the travelling member when the ring gear is in high speed position, and means operable by the travelling member for shifting the ring gear from one position to the other.

24. In apparatus of the character described, a driving member, a driven member, gearing connecting said members, a threaded shaft connected to the driven member to be actuated thereby, an arm carried by said shaft, actuating means operable by torque reaction of the gearing, and control means for the driving member operable by either of said actuating means or said arm.

PETER P. DEAN.